Oct. 1, 1935.　　　　F. W. REAM　　　　2,016,177
TRANSMISSION MECHANISM
Filed April 7, 1934　　　2 Sheets-Sheet 2
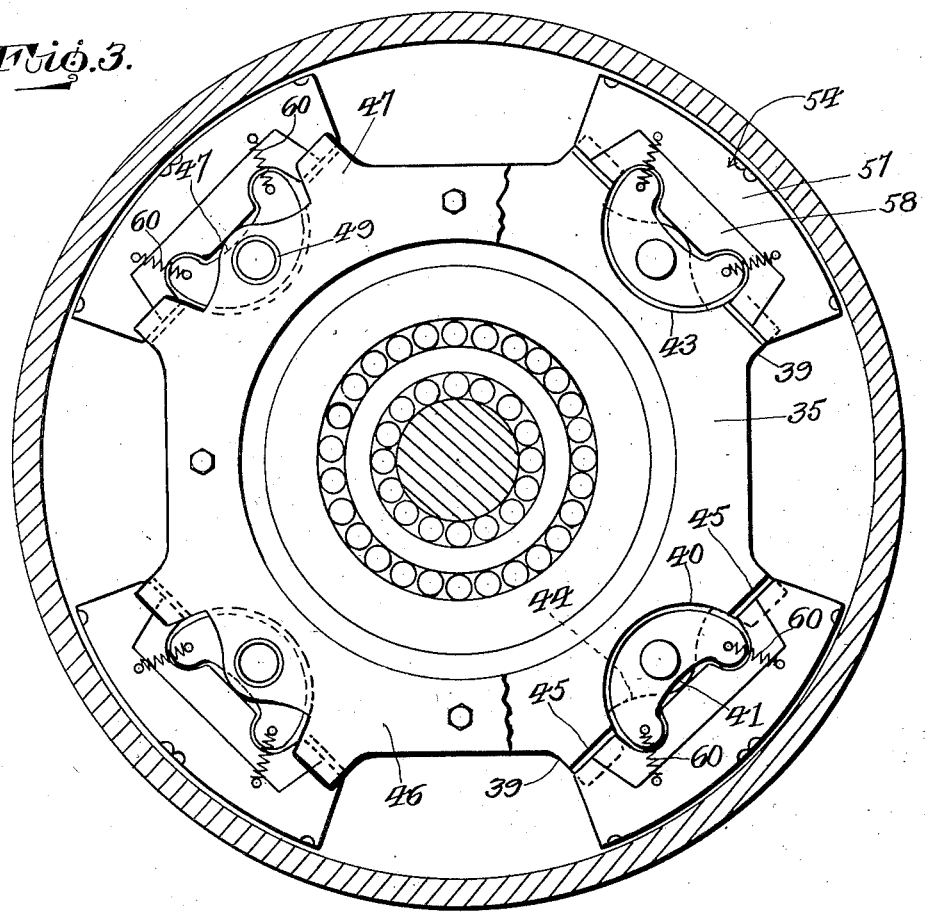
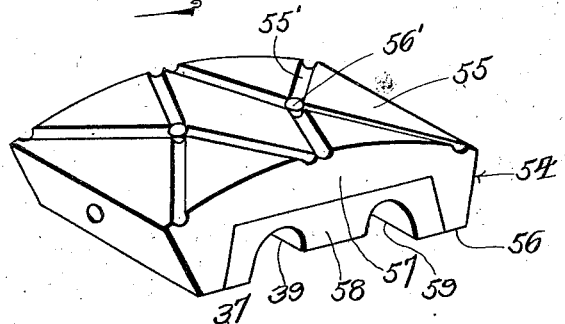
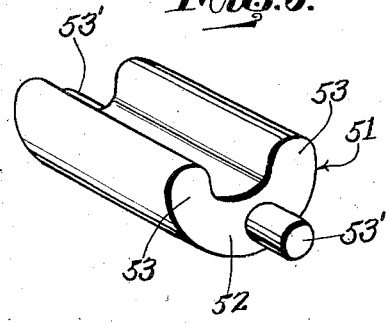
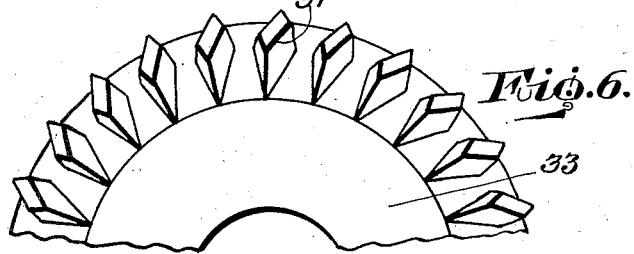
Inventor
F. W. Ream
Geo. F. Kimmel
Attorney Patented Oct. 1, 1935

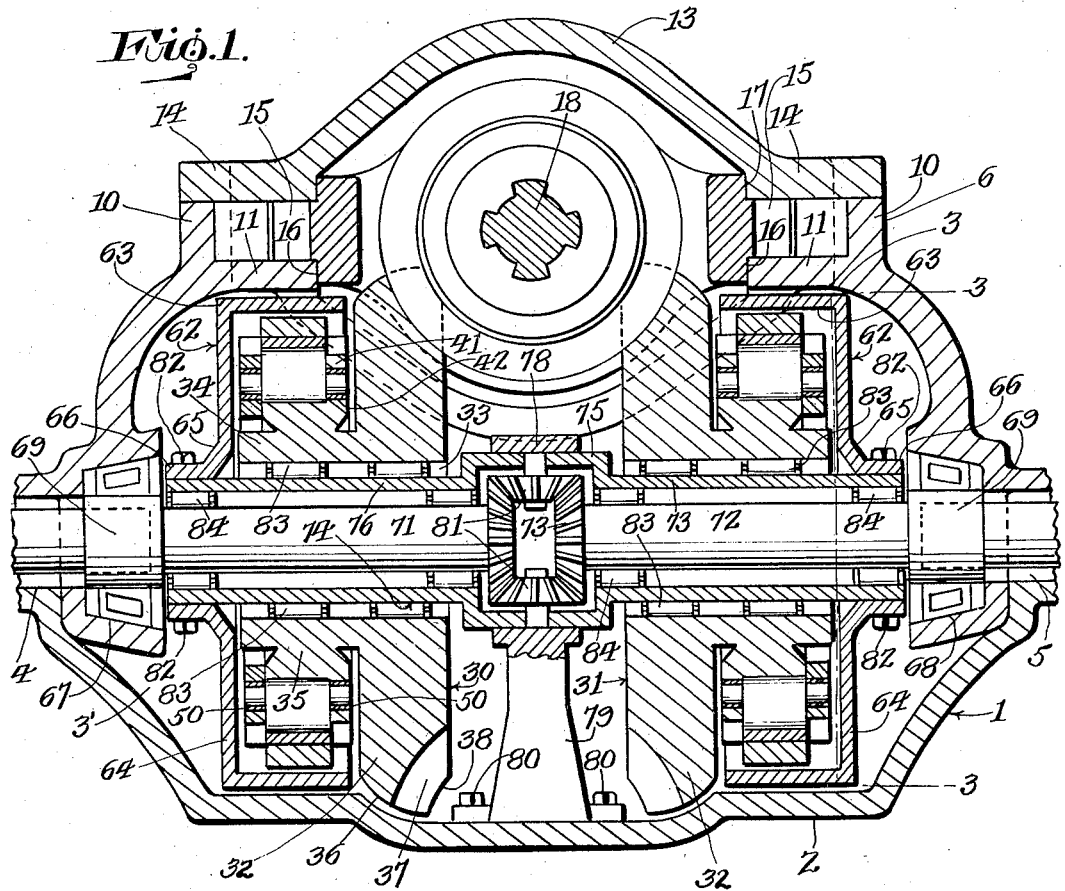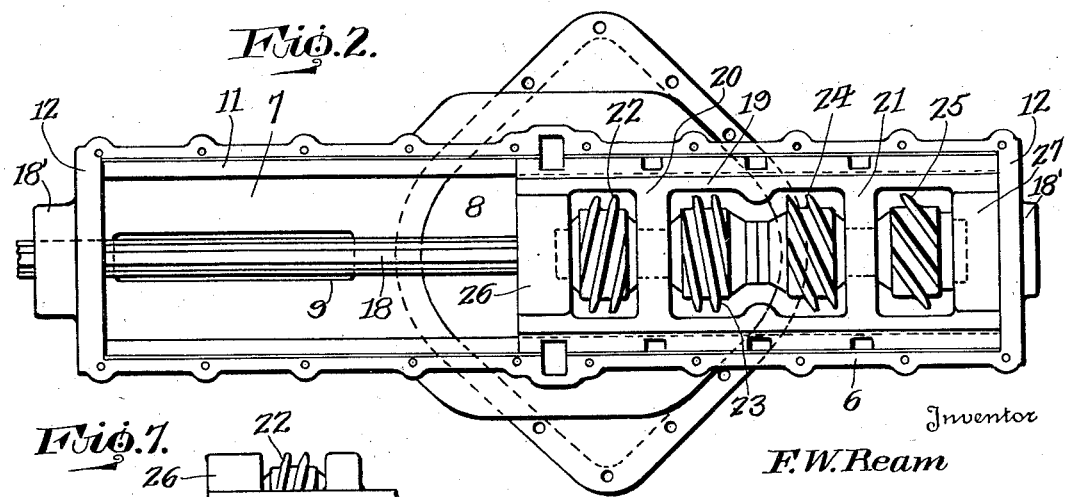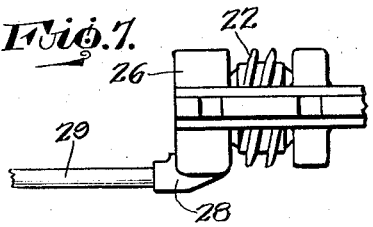

2,016,177

UNITED STATES PATENT OFFICE 2,016,177

TRANSMISSION MECHANISM

Fay W. Ream, Sheridan, Wyo., assignor to Andrews Worm Transmission Corporation, a corporation of Wyoming Application April 7, 1934, Serial No. 719,547

8 Claims. (Cl. 74—425.5)

This invention relates to a transmission mechanism of that type employing a plurality of differently pitched worms for selective engagement with and for simultaneously driving a pair of master gears for transmitting power, and the invention has for its primary object to provide, in a manner as hereinafter set forth, a mechanism of the class referred to whereby a pair of internal automatically expandible clutching structures carried by and expanded on the operation of the master gears are utilized for revolving a tubular element acting as a driving means for propelling purposes.

A further object of the invention is to provide, in a manner as hereinafter set forth a transmission mechanism having a pair of revoluble automatically expandible clutching structures for transmitting power for propelling purposes.

A further object of the invention is to provide, in a manner as hereinafter set forth, a transmission mechanism having revoluble automatically expandible clutching structures operated from a pair of driven elements for transmitting power to a differential mechanism employed for operating a pair of axle sections.

A further object of the invention is to provide, in a manner as hereinafter set forth, a transmission mechanism in which a set of axially aligned and axially shiftable worms are selectively engageable with a pair of axially aligned gears driving through a pair of axially aligned clutches, and with the clutches expanding internally against a part of axially aligned drums acting to revolve a tubular element connected at its center with and for operating a differential mechanism for propelling purposes.

A further object of the invention is to provide, in a manner as hereinafter set forth, a transmission mechanism with a pair of automatically expandible revoluble power clutching structures operated from revoluble driven elements therefor, in both forward and reverse direction, as well as being over-running or free wheeling in both forward and reverse motion.

Further objects of the invention are to provide, in a manner as hereinafter set forth, a transmission mechanism for the purpose referred to which is comparatively simple in its construction and arrangement, strong, durable, compact, thoroughly efficient in its use, readily repaired when occasion requires, constructed and arranged in a manner whereby when an element thereof becomes damaged or impaired a new one may be substituted without discarding the entire structure, and comparatively inexpensive to set up.

To the above ends essentially, and to others which may hereinafter appear, the invention consists of such parts, and such combination of parts which fall within the scope of the invention as claimed.

In the drawings:—

Figure 1 is a transverse cross sectional view of the transmission mechanism showing the adaptation thereof with respect to the rear axle sections of an automotive vehicle, Figure 2 is a top plan view with the cover of the housing removed, Figure 3 is a section on line 3—3 of Figure 1.

Figure 4 is a perspective view of the form of clutching shoes employed in a clutching structure, Figure 5 is a perspective view of the form of cam rollers employed in a clutching structure and which are associated with the clutching shoes, Figure 6 is a fragmentary view in elevation showing the form of the teeth of a master gear, Figure 7 is a fragmentary view in side elevation illustrating a shafting means for the set of worms.

In the drawings, a housing is indicated generally at 1 and which includes a lower portion 2 and an upper portion 3 of less width than and extended laterally in opposite directions with respect to the portion 2. The latter provides a chamber 3' having its sides formed with aligning openings 4, 5. The portion 3 includes a lower section 6 of oblong contour in plan and is formed with a bottom 7 having respectively an opening 8 intermediate its ends to provide a clearance and a depression portion 9 adjacent opening 8. The purpose of the clearance and the depressed portion will be hereinafter referred to. The section 6 includes a pair of sides 10, each having its inner face lengthwise thereof and below its top edge formed with a track 11 for a purpose to be referred to. The section 6 includes a pair of apertured end walls 12 having their top edges arranged above the tracks 11. The upper portion 3 also includes a cover section 13 for the section 6 and which has flat side parts 14 coacting with the tracks 11 to provide inwardly opening grooves 15. The tracks 11 and side parts 14 also form shoulders 16, 17 respectively. The purpose of the grooves 15 and shoulders 16, 17 will be presently referred to. The sections 6 and 13 are detachably connected together.

Journaled at one end in one end wall 12 and extended through, beyond and journaled in the other end wall 12 of section 6 is a rotatable splined power transmitting shaft 18 operated from a prime mover, not shown, such by way of example as the engine of an automotive vehicle. The end walls 12 have extended bearings 13' for shaft 18. Slidably mounted on the tracks 11 and upon shaft 18 is a worm carriage 19 in the form of a rectangular frame having spaced parallel apertured cross members 20, 21. Arranged within supported by and bodily moving with the carriage 19, as well as being slidably mounted on and bodily rotatable with the shaft 18 is a set of permanently spaced axially aligned and axially shiftable worms four in number and designated 22, 23, 24 and 25. The worm 22 is for reverse and the worms 23, 24 and 25 for first, second and third speeds respectively. The worm 22 is arranged between the leading end 26 of carriage 19 and cross member 20. The worms 23, 24 are positioned between the cross members 20, 21 and arranged in abutting relation, and the worm 25 is arranged between the cross member 21 and the follower end 27 of carriage 19. The arrangement of the worms relative to each other is such that one can clear the master gears before another enters. The sides of carriage 19 not only extend into the grooves 15 which constitute guides therefor, but also ride against the shoulders 16, 17, Figure 1. The leading end 26 of the carriage 19 has depending centrally with respect to its bottom a coupling member 28 (Figure 7) for a rod 29 operated from a suitable gear changing means, not shown, by the operator of the vehicle. The member 28 depends into the portion 9 of bottom 7. The rod 29 is arranged in portion 9 and extends through the leading wall 12 of section 6 of the upper portion 3 of housing 1. The rod 29 is arranged below shaft 18. The opening 8 provides a clearance for the worms to extend into the lower portion 2 of housing 1 for the purpose of meshing with a pair of oppositely disposed master gears 30, 31 which are arranged in chamber 3' and extend into portion 3 of housing 1.

Each master gear consists of a circular body part 32 having an axial opening 33, a hub 34 registering with opening 33 and extending outwardly from the outer side face of body part 32. The hub 34 is formed intermediate its ends with a peripheral endless flange 35 arranged in spaced relation with respect to body part 32. The outer edge 36 of body part 32 in transverse cross section is rounded. The inner corner of body part 32 is cut away at spaced intervals to form a circular row of spaced diamond shaped teeth 37 of substantially segmental contour having concaved outer ends 38 (Figures 1 and 6). The teeth 37 are so formed and disposed that opposite faces of each tooth will be flush with the inner face and outer edge of the body portion of a gear. The teeth 37 are disposed at an inclination with respect to the vertical median and located within the body portion of a gear, that is to say the teeth do not extend beyond the outer edge and inner side face of and are spaced from the outer side face of the gear body. The flange 35 is formed at its outer edge with equi-spaced radially disposed protuberances 39 preferably four in number. The flange 35 is formed with equi-spaced transversely disposed grooves 43. Each groove is semi-circular and of a depth to extend from a point spaced from the hub to and open at the outer edge of a protuberance. Each groove is of a length to extend from the outer side face to a point adjacent the inner side face of the flange 35 (Figure 1) whereby one end of the groove is closed and its outer end open. That portion of the flange 35 and the protuberance which acts as a closure for the inner end of groove 43 is in the form of web 40 having a tapered upper portion 41 provided with an opening 42. The side edges 44 of the tapered portion 41 of web 40 are spaced from the wall of groove 43. Each protuberance is of substantially oblong contour and has the edge portions thereof 45 adjacent the side walls of the groove 43 squared. Detachably secured against the outer side face of the flange 35 is a retaining plate 46 of ring like form. The inner edge of plate is spaced from the hub 34. The plate 46 is formed with spaced protuberances 47 which are positioned against and extend beyond the protuberances on the flange 35. The intermediate part 48 of each protuberance 47 corresponds in contour to and aligns with a web 40, and such intermediate part is provided with an opening 49 aligning with opening 42. The parts 48 of the protuberances 47 close the outer ends of the grooves 43, and in connection with the latter and the webs 40 provide pockets in and which open at the outer edges of the protuberances 39. Mounted in the openings 43, 49 are bushings 50. The purpose of the protuberances 49 extending beyond the outer edge of the protuberances 39 on the flange 35 will be presently referred to, as well as the purpose of closing that end of the grooves 43 at the outer side face of the flange 35. The latter and plate 46 form a carrier for an automatically expandible revoluble power clutching structure.

Associated with and operated from each master gear is an automatically expandible revoluble power clutch structure for clutching a drum with a master gear to provide for the revolving of the drum. Each clutch structure includes a set of cam rollers of a number corresponding to the number of pockets in a carrier. Each cam roller is mounted in a pocket and journaled in a carrier. Each cam roller is generally indicated at 51 and consists of a body part 52 of substantially segmental contour in transverse cross section. The body part 52 merges into a pair of outwardly directed parallel spaced rounded ribs 53 disposed lengthwise of and corresponding in length to that of body part 52. Each rib is flush with a side and with the ends of body part 52. Extending from the ends of the body part 52 and aligning with the longitudinal median of the latter is a pair of oppositely disposed trunnions 53' which are journaled in the bushings 50 arranged in aligning openings 42, 49. Opposing each protuberance 39 is a metallic clutch shoe 54 having an arcuate outer or working face 55 and an inner flat face 56 which is disposed parallel to the edge portions 45 of a protuberance 39. The shoe 54 is formed of a pair of sections 57, 58, the latter being in the form of an inset positioned in the section 57 from the inner face of the latter. The section 58 is of harder material than that of the section 57. The section 58 is disposed transversely of and is flush with the sides of section 57. The section 57 is provided in its inner face with a pair of spaced parallel rounded grooves 59 for the reception of the rounded ribs 53. The transverse cross sectional area of each groove 59 is slightly greater than the transverse cross sectional area of a rib. The ribs of each roller cam are connected to a clutch shoe by coiled springs 60. That portion of the exposed face of the section 58 arranged between the grooves 59 and indicated at 58' is spaced from that portion 52' of the outer face of the body part 52 of a cam roller 51. The portion 58' is inset with respect to the remaining portion of the inner face 56 of the shoe 54. The latter has its working face 55 grooved as at 55' for the passage of lubricant. The shoe 54 also is formed with lubricant wells or parts 56'.

The inner side of protuberance 39 is formed with extensions 61 which coact with the protuberances 47 for retaining the clutch shoes 54 in opposed relation with respect to the protuberances 39. As the plate 46 is removable provision is had for the positioning and removing of the roller cams and clutch shoes when desired.

Surrounding each set of clutch shoes 54 and engageable thereby is a drum 62 formed of an annular body part 63 and a circular head 64 which is integral with the outer side of body part 63. The head 64 has an outwardly extending tapered apertured central portion 65 which merges into an outwardly directed annular flange 66. The drums 62 are oppositely disposed and the annular body part 63 of each encompasses in close relation, but is normally free of the working or clutching face of a set of clutch shoes 54.

The housing 1 is provided therein in proximity to the openings 4, 5 of lower portion 2 thereof with oppositely disposed supports or pockets 67, 68 respectively for the reception of oppositely disposed bearing structures 69, 70 respectively for the oppositely extending rear axle sections 71, 72 respectively connected at their inner ends to a differential mechanism 73. Encompassing the axle sections 71, 72, the mechanism 73 and extending from the bearing structure 69 to the bearing structure 70 is a revoluble tubular driving element 74 for the mechanism 73. The central portion 75 of the element 74 is of greater outer and inner diameter than that of the remaining portions 76, 77 of said element. The portion 75 revolves within an annular bearing 78 which is carried by a vertical support 79 arranged between the lower portion of the master gears 30, 31. The support 79 is anchored to the bottom of housing 1, and at 80. The portion 75 of element 74 has arranged the rein and bodily carries the driving pinions 81 of the mechanism 73. The flanges 66 of the drums 62 are anchored to the portions 76, 77 of element 74, as at 82 whereby said element 74 will revolve with the drums.

Interposed between the body parts of the master gears, the hubs of the latter and the portions 76, 77 of element 74 are bearings 83. Interposed between the axle sections and the portions 76, 77 of the element 74 are bearings 84.

When power is applied to the carriers (flanges 35 and plates 46) through a worm and the master gears, considering the forward motion is to the right, pressure is brought to bear on the trunnions 53' of the cam roller, the latter moves anti-clockwise with its forward rib moving upwardly and back against the shoe 54. At the same time centrifugal force, as the speed picks up, carries the shoe 54 upward and back operating in unison with the cam roller and contacting with the inner face of the body part 63 of a drum 62. The more power that is applied from the engine, the greater the pressure will be between the clutch shoe 54 and the drum 62. As the pressure increases as the engine develops torque there will be just enough slippage in starting to insure a soft smooth start without any jerk, and still enjoy positive power application against the drum 62.

When the clutch is not operating, the outer edge portions on the inner side of the shoes rest upon the edge portions 45 of the protuberances 39. The springs 60 are of the proper tension and strength, that at idling speeds they overcome the centrifugal force of shoes 54 and the tendency of the cam rollers to move, so keeping the shoes 54 out of contact with the drums.

Taking the full operation of the clutch through its various stages; the car is standing still with the engine dead and the worm is in neutral or not engaged with the master gears; step on the starter, warm up the motor ready to go; remove foot from accelerator allowing engine to idle, shift the worm into first speed forward and step on the gas; the power clutch automatically goes into action as above described; when the proper speed in this ratio is attained, take your foot off the gas, compression quickly reduces engine speed and the forward motion of the drum 62 combined with the action of the springs 60, carries the shoes back into neutral position. Aiding this operation, the rear spring is under the greatest tension as the rear rib of the cam-roller is pulling downward and away from the shoe and the rear end of the shoe will release first, breaking contact with the drum. The drive wheels and drum 62 are then free-wheeling with the momentum of the car and all load is entirely off of the master gears allowing a quick and noiseless shift into the next higher gear ratio; step on the gas again and the clutch repeats its operation. This clutch operates exactly the same way in reverse motion.

These clutches, while they do not engage at idling speeds of the engine when once in neutral, still when once put into operation and pressure is applied, the car speed can be lessened to as low a point as the engine will function and still the cam rollers will keep up a constant pressure on the shoes and the drums.

When coasting down long, steep grades, and it is desired to use the motor compression for braking, step on the gas just enough to develop sufficient centrifugal force in the power clutch and as the shoes come into contact with the greater forward speed of the drum 62, the shoes will be pulled forward and reverse action takes place on the rear rib of the cam-rollers tending to wedge them against the forward motion of the drum applying braking force to the speed of the drum. However, as the power on the clutch is then reversed and coming from the outside instead of the inside, and as the application of power is applied from the drum to the shoes by the friction of only two smooth machined surfaces, there will be some slippage but there will develop enough holding or retarding force to utilize the major braking power of the engine compression. This braking force can be removed at any time by stepping on the gas and increasing the speed of the clutch to equal the speed of the drum so that the pressure is removed from the cam-rollers and then either more power can be applied to pull the car forward or the engine can be allowed to go back to idling speed and the clutch will go back to neutral or non-pulling position.

The transmission mechanism as herein set forth, when employed with automotive vehicles, does away with a clutch pedal entirely, due to the clutch structures, forming elements of the mechanism being inherently automatic.

What I claim is:—

1. In a variable speed and reverse drive mechanism for the rear wheels of an automotive vehicle and of that type including a pair of oppositely disposed spaced parallel simultaneously driven master gears, the combination of a supporting structure arranged over said gears and provided with a track, a splined rotatable power transmitting shaft journaled in the ends of and extended from said structure, an adjustable skeleton carriage travelling on said track and slidably encompassing said shaft in spaced relation, a plurality of threaded speed change controlling elements and a threaded reverse drive element for operating said gears simultaneously, said elements arranged within, journaled in, confined in and bodily moving in unison with said carriage, said elements being slidably mounted on and splined to said shaft, said elements for selectively meshing with the teeth of the gears on the adjustment of the carriage, the threads of each of said elements being of the worm type, the pitch of the threads of one element being different with respect to the pitch of the threads of any one of the other of said elements, and means for adjusting the carriage to provide for the selective engagement of said elements with the teeth of the gears.

2. In a variable speed and reverse drive mechanism of the construction set forth in claim 1 the providing of the bottom of said structure with an opening for the passage of the said elements and with a depressed portion adjacent said opening, and the providing of the carriage at one end with a depending coupling member for moving into and out of said depressed portion and having the adjusting means for the carriage secured thereto.

3. In a variable speed and reverse drive mechanism of the construction set forth in claim 1 the providing of said structure and carriage with coacting parts for confining upon and for guiding the carriage on the track provided by said structure, and the latter at each end thereof having means for limiting the travel of the carriage in opposite directions.

4. In a variable speed and reverse drive mechanism for the rear wheels of an automatic vehicle and of that type including a pair of oppositely disposed spaced parallel simultaneously driven master gears, the combination of a supporting structure arranged over said gears and provided with a track, a splined rotatable driven power transmitting shaft journaled in the ends of and extended from said structure, an adjustable carriage travelling on said track and slidably encompassing said shaft in spaced relation, a plurality of threaded speed change controlling elements and a threaded reverse drive element for selectively operating said elements simultaneously, said gears being journaled in and bodily moved in unison by said carriage, said elements being slidably splined to and bodily revolved with said shaft, said elements for selectively meshing with the teeth of the gears on the adjustment of the carriage, the threads of each of said elements being of the worm type, the pitch of the threads of one element being different with respect to the pitch of the threads of any one of the other of said elements, and means for adjusting the carriage on said track to provide for the selective engagement of said elements with the teeth of the gears.

5. In a variable speed drive of the construction set forth in claim 4 the providing of said carriage with means to prevent the moving of said elements lengthwise of the shaft independent of each other.

6. In a variable speed and reverse drive mechanism for the rear wheels of an automobile and of that type including a plurality of threaded speed change controlling elements and a threaded reverse drive element bodily shiftable together, the combination of a pair of oppositely disposed spaced parallel master gears adapted to be simultaneously engaged by and driven in unison by one of said elements, each of said gears being formed with a circular row of diamond shaped teeth having opposite faces thereof flush with the outer edge and the inner side face of the gear body.

7. The invention, as set forth in claim 6, having the outer end of each of the teeth of each row of concave contour.

8. The invention as set forth in claim 6, having the bases of the teeth of each row within the body of a gear and disposed at an inclination with respect to the outer edge and inner side face of said body.

FAY W. REAM.